United States Patent Office

3,483,261
Patented Dec. 9, 1969

3,483,261
PREPARATION OF α,α-DIMETHYLBENZYL ALCOHOL
Benjamin F. Lokey, La Vale, Md., assignor to Hercules Incorporated, a corporation of Delaware
No Drawing. Application Dec. 9, 1964, Ser. No. 417,199, now Patent No. 3,227,765, which is a continuation-in-part of application Ser. No. 49,848, Aug. 16, 1960. Divided and this application Dec. 9, 1965, Ser. No. 512,816
The portion of the term of the patent subsequent to Jan. 4, 1983, has been disclaimed
Int. Cl. C07c 27/12, 31/14
U.S. Cl. 260—618         2 Claims This application constitutes a division of my application for Letters Patent, Ser. No. 417,199, filed Dec. 9, 1964, now U.S. 3,227,765, which in turn is a continuation-in-part of my application for Letters Patent, Ser. No. 49,848, filed Aug. 16, 1960, now abandoned.

This invention relates to a process involving the oxidation of cumene and more particularly it relates to a method for converting cumene to a product containing a high yield of α,α-dimethylbenzyl alcohol but containing substantially no α,α-dimethylbenzyl hydroperoxide and acetophenone.

It is known that cumene may be oxidized to reaction products containing preponderant amounts of either α,α-dimethylbenzyl hydroperoxide or α,α-dimethylbenzyl alcohol. Either one of these products may be obtained in higher yield in relation to the other by suitable selection of reaction conditions. For example, it has been shown that the formation of α,α-dimethylbenzyl alcohol is favored by the use of heavy metal oxidation catalysts and by comparatively high temperatures. However, even under such conditions, substantial amounts of the hydroperoxide and acetophenone have been formed.

A method for the preparation of high purity α,α-dimethylbenzyl alcohol in high yield is needed. The alcohol is useful, for example, as an intermediate in the production of α-methylstyrene and bis(α,α-dimethylbenzyl) peroxide. In the preparation of both of these compounds acetophenone should be absent, and α,α-dimethylbenzyl hydroperoxide should not be present in the preparation of α-methylstyrene. Various methods have been devised to prevent or remove the hydroperoxide and the acetophenone contents of an oxidate containing α,α-dimethylbenzyl alcohol.

It was found that by oxidizing cumene to a low conversion to oxygenated product, it was possible to keep the ketone content comparatively low in relation to the total crude oxidate. However, the amount of ketone was still appreciable in relation to the total oxygenated products recovered by distillation of the crude oxidate to remove unreacted cumene. Furthermore, under these conditions of low conversion, the amount of hydroperoxide formed was considerable, and it became necessary to remove the hydroperoxide by chemical treatment involving an additional step. For example, it is known to reduce the hydroperoxide with hydrogen catalytically or through use of sodium sulfite or sodium sulfide. It also was found possible to effect reaction between the hydroperoxide and unreacted cumene by heating in the presence of certain catalytic materials.

All of these procedures are disadvantageous, however, in that they result in a sacrifice in alcohol yield or necessitate utilization of additional processing steps. It long has been desired that a simplified process could be devised for converting cumene to a reaction product containing α,α-dimethylbenzyl alcohol as the principal oxidation product, with essentially no α,α-dimethylbenzyl hydroperoxide and the minimum in amount of acetophenone.

Now in accordance with this invention, the oxidation of cumene is carried out by intimately contacting cumene in liquid phase with oxygen under either atmospheric or higher pressures, or with air under pressures greater than atmospheric, at temperatures of about 90° to about 120° C. in the presence of aqueous solutions of sodium hydroxide ranging in concentration from about 45% to about 70% by weight of sodium hydroxide. Having thus described the invention, the following examples are offered as specific embodiments thereof. All parts and percentages are by weight unless otherwise indicated.

EXAMPLE 1

A stainless steel autoclave equipped with a reflux condenser and a stirrer and designed for high pressure oxidations was charged with 90 parts of cumene (refractive index at 20° C., 1.4910; purity, 95–97%) and 12.6 parts of sodium hydroxide in the form of a 45.2% aqueous sodium hydroxide solution. Stirring was begun, and air was introduced, with the pressure reaching 80 p.s.i.g. Steam was turned on in the coils surrounding the autoclave, and the temperature was raised to 70° C., then gradually to 90° C. over a period of one hour. Air was passed through the reaction mixture at a rate of 0.17 cubic feet/minute/kilogram of cumene.

Oxidation at the 90° C. temperature was carried out for 11.0 hours, at which time the oxidate had a specific gravity of about 0.940 and contained about 5% of α,α-dimethylbenzyl hydroperoxide. At this point, the pressure on the system was released, but all other reaction conditions were maintained. The oxidate then was digested for a period of 9.5 hours and during this time, by means of a water trap in the reflux system, 13 parts of water was removed from the reaction system. The cumene also occurring in the distillate was returned, after separation from the water, to the autoclave.

The reaction mixture resulting from the digestion step was washed twice with water to remove substantially all of the sodium hydroxide, each water wash amounting to about 30 parts. These was obtained 76.2 parts of washed product, and upon analysis it was found to have a specific gravity of 0.954 and to contain 66.5% α,α-dimethylbenzyl alcohol, 0.1% α,α-dimethylbenzyl hydroperoxide and 33.4% cumene. The weight of cument consumed accordingly was 64.5 parts, and the percent cumene reacted was 71.8. The amount of sodium hydroxide charged was thus 0.195 gram per gram of cumene reacted $$\left(\frac{12.6 \times 100}{90 \times 71.8}\right)$$

In comparison, when the reaction conditions of the oxidation step of the above process were essentially duplicated, but the digestion and water-removal steps were omitted, there was obtained an oxidate which, after water washing, had a specific gravity of 0.952 and analyzed for 59% alcohol, 4% hydroperoxide and 37% cumene.

EXAMPLE 2

In contrast to the exhaustive, batch-type of oxidation in the preceding example, cumene was oxidized continuously and to a comparatively low percent cumene reacted level in the present example. The equipment was composed of a glass oxidation vessel fitted with a reflux condenser, thermometer, high-speed stirrer, internal cooling coil and external heating. Reactants were fed to the top of the oxidizer and product was withdrawn from the bottom.

The cumene used in this example was 98–100% pure, the sodium hydroxide was in the form of a 50% aqueous solution, the oxidant was oxygen and the pressure was atmospheric. The oxidizer was charged with a cumene oxidate from a previous run, and stirring and introduction of oxygen were begun. The temperature of the reaction mixture was brought to 110° C., and then the cumene, the aqueous caustic and oxygen were introduced, and product removed, at the desired rates to provide a steady state of oxidation. In the present instance, the introduction of the 50% aqueous sodium hydroxide was at a rate sufficient to provide 4.9 parts of sodium hydroxide/ 100 parts of cumene, and the oxygen flow was such as to provide an off-gas rate which was about equal to oxygen consumption.

After steady operation was established, the oxidation was run for a period of 1.64 hours, the average rate of oxidation being 12.9%/hour. The percent cumene reacted was 21.1. The amount of sodium hydroxide charged was 0.23 gram per gram of cumene reacted (4.9/21.1). A sample of the oxidate, after being washed with 0.5 its weight of water at room temperature, was analyzed and found to contain 76% cumene, 17.6% alcohol, 3.1% hydroperoxide, 0.8% acetophenone and 0.6% bis($\alpha,\alpha$-dimethylbenzyl) peroxide. The reaction yield for the alcohol was calculated to be 77.4%.

A portion of the unwashed oxidate in an amount of 171.9 parts was charged to a glass reaction vessel fitted with a condenser, stirrer and thermometer, and heated to 125° C. A total of 3.7 parts of distillate was removed, this constituting 1.8 parts of water and 1.9 parts of cumene. The oxidate was then stirred for one hour, after which the hydroperoxide concentration was 0.2%. The digested product, minus the samples removed for hydroperoxide determination, amounted to 155.3 parts, and this was washed with water in the same way as the oxidate, yielding 138.5 parts of washed product. Analysis showed that the product contained 76% cumene, 24% alcohol, 0.2% hydroperoxide, 0.6% acetophenone and 0.6% bis($\alpha,\alpha$-dimethylbenzyl) peroxide. The reaction yield for the alcohol was 88.5%.

A comparable oxidation except for use of 1.7 parts sodium hydroxide/100 parts of cumene was carried to a percent cumene reacted level of 19.0, and gave a washed oxidate analyzing for 78% cumene, 14.3% alcohol, 4.9% hydroperoxide, 0.7% acetophenone and 0.5% peroxide. Digestion of the oxidate with reduction in the hydroperoxide content was accomplished in about one-third of the time used in the first run under this example, showing an advantage for using a lower level in amount of sodium hydroxide. In the present run the amount of sodium hydroxide charged was 0.09 gram per gram of cumene reacted (1.7/19).

EXAMPLE 3

Cumene was oxidized as in the first run under Example 2 except to use a temperature of 90° C. and a steady state reaction period of 3.03 hours. The percent cumene reacted was 24.3 (0.20 gram sodium hydroxide charged/ gram cumene reacted), and the average oxidation rate was 8%/hour. A sample of the oxidate, after being washed as in Example 2, analyzed for 75% cumene, 21% alcohol (reaction yield, 80.3%), 3.5% hydroperoxide, 0.8% acetophenone and 0.3% peroxide. A portion of the unwashed oxidate was digested for 4 hours at 98° C. and was sparged with nitrogen during this period to remove water. The digested product was then washed in the same manner as the oxidate, and the washed product was found to contain 72% cumene, 25.8% alcohol (reaction yield, 89.5%), 0.1% hydroperoxide, 0.5% acetophenone and 0.6% peroxide.

A comparable oxidation in which the concentration of the aqueous sodium hydroxide solution was reduced to 40% resulted in an oxidate of substantially increased hydroperoxide content. Furthermore, water removal from and digestion of the oxidate showed a comparatively low (about one-fourth) rate of disappearance of hydroperoxide content. This finding, plus the indicated operability of aqueous 45% sodium hydroxide in Example 1, establishes the need for charging to the oxidation an aqueous sodium hydroxide having a minimum concentration of about 45%. It also was found that under the conditions of the present example, substantially no oxidation occurred when air at atmospheric pressure was substituted for oxygen.

The process of this invention is dependent upon a combination of certain specific and limited reaction conditions. In the oxidation, the temperature is between about 90° and about 120° C., the preferred range being about 90° to about 100° C. Below 90° C. the oxidation does not proceed at a satisfactory rate and above 120° C. the yield of $\alpha,\alpha$-dimethylbenzyl alcohol decreases with increasing temperature.

A most important factor is the concentration of the aqueous sodium hydroxide solution charged to the process. Below about 45%, the hydroperoxide content increases during the oxidation, and the rate of oxidation decreases. In other words, an aqueous sodium hydroxide concentration below about 45% will not accomplish the objective of high rate of oxidation with minimum hydroperoxide formation. Concentrations above about 70% are not practical due to the high freezing points of the solutions and the resulting difficulty of keeping process lines from plugging. Preferred concentrations are in the range of about 45 to about 55%, with 50% being the most preferred concentration value.

The amount of 45% to 70% aqueous sodium hydroxide charged to the oxidation must be sufficient to provide adequate alkalinity in the oxidation, in which there is a consumption of the sodium hydroxide charged. With 45% aqueous sodium hydroxide, the amount may be from about 2.2 to about 66.7 parts by weight per 100 parts by weight of cumene charged to the oxidation. With 70% aqueous sodium hydroxide, the amount may be from about 1.4 to about 42.9 parts by weight per 100 parts by weight of cumene. The corresponding amounts for 50% aqueous sodium hydroxide are from about 2 to about 60 parts, and for 55% aqueous sodium hydroxide are from about 1.8 to about 54.5 parts by weight per 100 parts by weight of cumene.

In general, for the over-all range of between about 45% and about 70% aqueous sodium hydroxide, an amount of aqueous sodium hydroxide from about 10 to about 45 parts by weight per 100 parts of cumene will provide a high rate of oxidation with minimum hydroperoxide formation. A preferred range is from about 10 to about 30 parts by weight per 100 parts of cumene. By minimizing hydroperoxide formation, there is less formation of acetophenone due to thermal degradation of the hydroperoxide.

The examples have shown percent cumene reacted values of about 20 to about 70%. However, this range may be between about 15 and about 70%. In an exhaustive oxidation such as that of Example 1, the percent cumene reacted may range from about 50 to about 70, but in continuous oxidations such as those of Examples 2 and 3 it is preferred not to exceed abotu 40%. Beyond this point, there is a fall-off in rate of oxidation and yield of alcohol. A preferable range is from about 20 to about 40% cumene reacted, with 30% being optimum.

As shown in the examples, either air or oxygen may be used as oxidizing agent. Both are operable under superatmospheric pressures, but the rate of oxidation with air is too low at atmospheric pressure. Operable pressures range from about 5 to about 500 p.s.i., but a preferred range is about 60 to about 200 p.s.i., this being particularly applicable to the use of air as oxidant. The temperature and pressure may be readily adjusted to obtain optimum results. The rate of input of the oxidizing agent may be varied depending upon whether oxygen or air is used, and upon the pressure. At pressures of from 50 to 200 p.s.i. for example, the rate of input may be from about 2 to about 200 liters of oxygen per hour per kilogram of cumene. A preferable range is from about 20 to about 60 liters of oxygen per hour per kilogram.

What I claim and desire to protect by Letters Patent is:

1. The process for converting cumene to α,α-dimethylbenzyl alcohol which comprises intimately contacting cumene in liquid phase with an oxidizing agent selected from the group consisting of oxygen and pressurized air at a temperature from about 90° to about 120° C. in the presence of an aqueous solution of sodium hydroxide having a concentration between about 45% and about 70% by weight of sodium hydroxide, the amount of said aqueous solution of sodium hydroxide being from about 1.5 to about 65 parts by weight per 100 parts by weight of cumene.

2. The process of claim 1 wherein the amount of aqueous solution of sodium hydroxide is from about 10 to about 45 parts by weight per 100 parts by weight of cumene.

References Cited

UNITED STATES PATENTS

| | | | |
|---|---|---|---|
| 2,438,125 | 3/1948 | Lorand et al. | 260—618 |
| 2,548,435 | 4/1951 | Lorand et al. | 260—618 |
| 2,687,438 | 8/1954 | Lorand et al. | 260—618 |
| 2,713,599 | 7/1955 | Lorand et al. | 260—618 |
| 3,009,963 | 11/1961 | Hock et al. | 260—618 |

LEON ZITVER, Primary Examiner

NORMAN P. MORGENSTERN, Assistant Examiner